United States Patent Office 3,182,071
Patented May 4, 1965

3,182,071
ACYLATED INDOLE DERIVATIVES
John Shavel, Jr., Mendham, Maximilian von Strandtmann, Rockaway Township, and Marvin P. Cohen, New Milford, N.J., assignors to Warner-Lambert Pharmaceutical Company, Morris Plains, N.J., a corporation of Delaware
No Drawing. Filed June 27, 1961, Ser. No. 119,831
20 Claims. (Cl. 260—319)

The present invention relates to new and novel acylated indole derivatives having the formula:

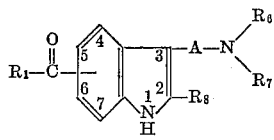

wherein the

substituent may be at the 4, 5, 6 or 7 position and wherein $R_1$ is lower alkyl such as methyl, ethyl, isopropyl, isobutyl, n-butyl and the like, cycloalkyl such as cyclopentyl, cyclohexyl and cycloheptyl, a 5 or 6 membered heterocyclic aromatic radical containing sulfur, oxygen, or one to two nitrogen atoms in the ring such as radicals derived from pyrimidine, furan, pyrrole, thiophene, pyran, pyridine, and thiopyran, naphthyl, and radicals of the formula

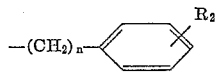

in which $n$ is 0 to 3 and $R_2$ which may be in the ortho, meta or para-position is phenyl, halogen, lower alkyl, trifluoromethyl, lower alkoxy, hydrogen, di-(lower alkyl)-amino, cycloalkyl, nitro, benzoyl and the acyl radical of an aliphatic carboxylic acid containing 2 to 6 carbon atoms; A is a radical of the formula

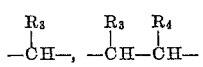

and

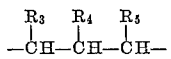

in which $R_3$, $R_4$ and $R_5$ are hydrogen, lower alkyl, or

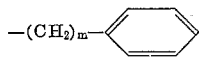

in which $m$ is 0 to 3; $R_6$ and $R_7$ are hydrogen, lower alkyl, cycloalkyl, lower alkyl substituted with a hydroxy, amino or lower alkoxy group, radicals of the formula

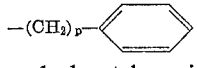

in which $p$ is 0 to 3, and when taken with the amino nitrogen atom form a piperidino, pyrrolidino or morpholino group, and when $R_6$ is hydrogen, $R_7$ may be benzoyl or the acyl radical of an aliphatic carboxylic acid containing 2 to 6 carbon atoms; and $R_8$ is hydrogen, carboxy or carbo-lower alkoxy. This invention also relates to the pharmaceutically acceptable non-toxic acid addition and quaternary ammonium salts of the above compounds, to a method of preparing them and to new and novel intermediates obtained in the course of the synthesis.

As used throughout the specification and in the claims, the following terms have the following means: "lower alkyl" and "lower alkoxy" refer to straight and branched chain aliphatic groups containing 1 to 6 carbon atoms; "cycloalkyl" refers to cyclic aliphatic groups containing 5 to 7 carbon atoms; and "halogen" refers to chlorine, bromine or fluorine.

The compounds of our invention are indole derivatives bearing a side chain at the 3 position containing an amino nitrogen atom and an acyl group at the 4, 5, 6 or 7 position. The substitution of an acyl group on the benzene ring of the indole structure to form compounds of the above formula has not heretofore been known and is an important feature of our invention.

The new and novel compounds of our invention are valuable intermediates useful in the preparation of other indole derivatives. For example, the presence of an

substituent renders our compounds susceptible to the various reactions of ketones involving a carbonyl group. In addition, our compounds have been found to possess interesting and significant pharmacological activity. They have a pronounced lowering effect upon blood pressure, with an ability to increase coronary flow, and also exhibit anti-serotonin activity and depress the central nervous system. Those compounds of our invention having the formula

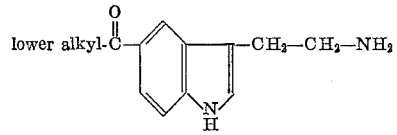

are unusually effective hypotensive agents which promote an increase in coronary flow and also exhibit anti-serotonin activity.

It has now been found that those compounds of our invention having the formula

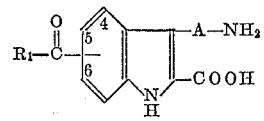

wherein $R_1$ and A are as described hereinabove and where the

substituent is at the 4, 5 or 6 position may be prepared by the following sequence:

First, a diazonium compound having the formula:

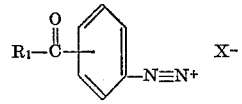

wherein the

substituent is meta or para to the nitrogen atom and X is halogen or hydroxyl is reacted with a substituted cyclic nitrogen-containing ketone of the formula:

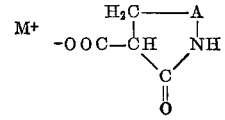

wherein M is hydrogen or an alkali metal to form a hydrazone of the formula:

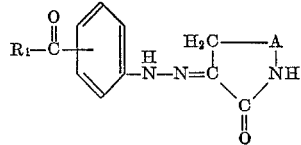

the 
substituent being meta or para to the nitrogen containing substituent.

This reaction is normally carried out at a temperature between about 0° C. and about 15° C. and at an acidic pH, preferably about 3 to 4. The precipitated hydrazone is recovered and purified by crystallization.

Then, the hydrazone prepared as described above is converted to a heterocyclic substituted indole of the formula

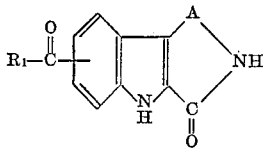

by heating with formic acid or a mineral acid, such as hydrochloric acid. Refluxing the above heterocyclic substituted indole derivative in the presence of aqueous alcoholic alkali, for example potassium or sodium hydroxide in aqueous ethanol, followed by acidification yields the desired compounds of the formula

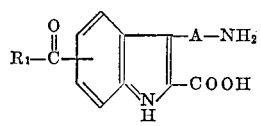

wherein the

substituent is at the 4, 5 or 6 position.

Those compounds of our invention of the formula

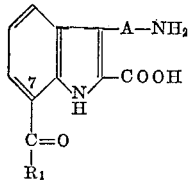

may be prepared by a modification of the foregoing procedure wherein the carbonyl group of the

substituent is protected as a

group during the sequence. The

group may be regenerated to an

either at the end of the sequence or at the heterocyclic substituted indole stage by an oxidation procedure, such as the well-known Oppenauer oxidation, which involves treatment under reflux with an aluminum alkoxide, such as aluminum phenoxide, aluminum isopropoxide, aluminum t-butoxide and the like and a ketone such as cyclohexanone or acetone in an inert organic solvent such as benzene, toluene and the like.

In addition, those compounds of our invention having the formula:

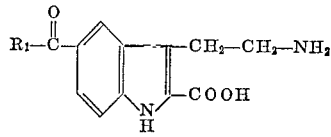

may alternately be prepared by treating the known compound 1,2,3,4-tetrahydro-1-oxo-β-carboline, described in German Patent 1,082,598, with an acyl halide of the formula

where X is halogen, or an acid anhydride of the formula

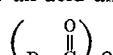

in the presence of a Friedel-Crafts catalyst to form a 6 - acyl - 1,2,3,4 - tetrahydro-1-oxo-β-carboline of the formula:

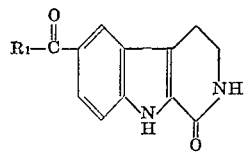

which may be hydrolyzed as described above to form a 5-acyl-2-carboxytryptamine. The acylation of 1,2,3,4-tetrahydro-1-oxo-β-carboline is described and claimed in copending application of John Shavel, Jr., entitled "Method of Preparing 6-Acylated Derivatives of 1,2,3,4-Tetrahydro-1-Oxo-β-Carboline," Serial No. 119,828, filed June 27, 1961.

Refluxing the acylated 2-carboxy substituted indole derivatives of the formula:

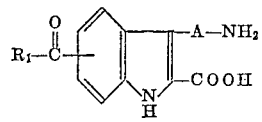

in which the

substituent is at the 4, 5, 6 or 7 position in an acid medium, for example a mixture of acetic and hydrochloric acids, followed by basification, results in decarboxylation to form those compounds of our invention having the formula

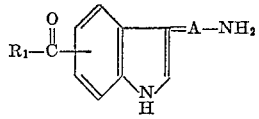

which compounds may in turn be N-acylated by conventional procedures to form compounds of the formula

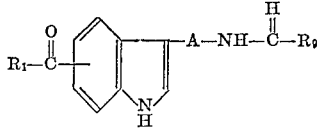

in which $R_9$ is phenyl or lower alkyl.

When 2-carboxy substituted indole derivatives of the formula

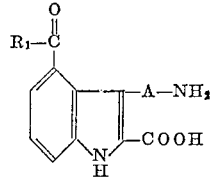

are decarboxylated as described above, it is observed that a cyclic intermediate having the formula

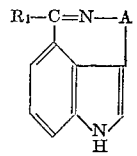

may be isolated from the reaction mixture. These cyclo-anhydro compounds have been observed to be the more stable forms of the 4-acylated indole derivatives of our invention having the formula:

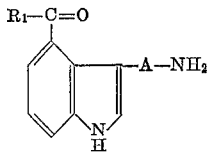

The acylated 2-carboxy substituted indole derivatives of our invention may be treated with formaldehyde in the presence of palladium on charcoal or with a mixture of formaldehyde and formic acid to form compounds of the formula:

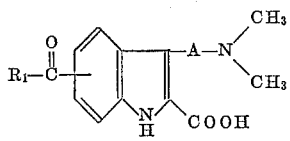

which may then be decarboxylated as described above to form compounds of the formula

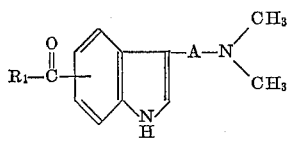

Those compounds of our invention having the formula

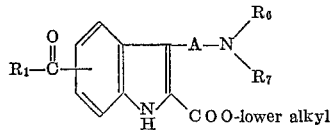

are prepared by the following sequence, as described and claimed in copending application of John Shavel, Jr., and Maximilian von Strandtmann entitled "Method of Preparing Substituted Indole Derivatives," Serial No. 119,830 filed June 27, 1961.

First, a keto ester of the formula

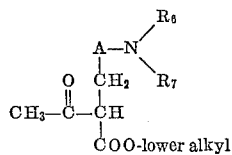

is coupled with a diazonium compound of the formula

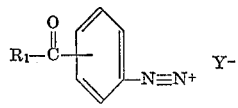

wherein Y is halogen or hydroxyl to form a hydrazone of the formula

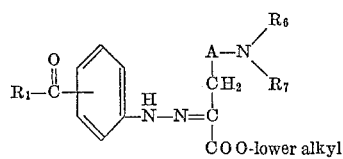

Then, the above hydrazone is heated with formic acid or a mineral acid to yield those compounds of our invention having the formula

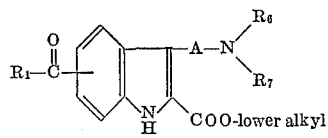

It has been found that these compounds may be hydro-lyzed and decarboxylated by treatment with an acid under reflux to yield compounds of the formula

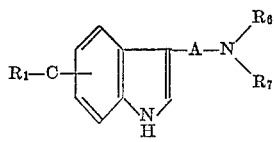

The compounds of our invention may be converted into their pharmaceutically acceptable non-toxic acid addition and quaternary ammonium salts by conventional procedures. Exemplary of non-toxic acid addition salts are those formed with maleic, fumaric, succinic, tartaric, citric, malic, cinnamic, sulfonic, hydrochloric, hydrobromic, sulfuric, phosphoric, and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate.

For therapeutic use, our compounds, either as the free base or in the form of salts, may be combined with conventional pharmaceutical diluents and carriers to form such dosage units as tablets, capsules, suppositories, elixirs, solutions or suspensions.

The following examples are included in order further to illustrate the present invention:

EXAMPLE 1

*2,3-piperidinedione-3-(p-acetylphenyl)hydrazone*

To 800 ml. of 0.5-N potassium hydroxide are added 68 g. 3-carbethoxy-2-piperidone and the mixture is kept at 30° for eighteen hours. The solution is filtered, cooled to 0°, and acidified with 40 ml. of 6-N hydrochloric acid. This is added with stirring at 0° to a fresh solution of p-acetylphenyldiazonium chloride, prepared from 54 g. p-aminoacetophenone in 725 ml. 2.7-N hydrochloric acid and 29 g. sodium nitrite in 100 ml. water. The solution is adjusted to about pH 3.5 by the addition of a solution of 140 g. anhydrous sodium acetate in 150 ml. water and stirred for 5 hours. The precipitated yellow-orange product is filtered off and recrystallized from 95% ethanol. Yield: 80 g. (82% of theory) of 2,3 - piperidinedione-3-(p-acetylphenyl)hydrazone, M.P. 229–31°.

Analysis—Calc.: C, 63.66; H, 6.16; N, 17.13. Found: C, 63.40; H, 6.28; N, 16.93.

EXAMPLE 2

*6-acetyl-1,2,3,4-tetrahydro-1-oxo-β-carboline*

A suspension of 69 g. of 2,3-piperidinedione-3-(p-acetylphenyl)hydrazone in 345 ml. 88% formic acid is refluxed for four hours. After cooling, 37 g. of precipitated material is filtered off and dried in vacuo over $P_2O_5$. An additional 13 g. of material is obtained by dilution of the filtrate with several volumes of water. Yield: 50 g. (78% of theory), M.P. 367–372°. Recrystallization from glacial acetic acid yields pure 6-acetyl-1,2,3,4-tetrahydro-1-oxo-β-carboline, M.P. 370–372°.

Analysis—Calc.: C, 68.40; H, 5.30; N, 12.27. Found: C, 68.35; H, 5.33; N, 12.08.

EXAMPLE 3

*5-acetyl-2-carboxytryptamine*

A suspension of 50 g. of 6-acetyl-1,2,3,4-tetrahydro-1-oxo-β-carboline in a solution of 110 g. potassium hydroxide in one liter of 60% aqueous ethanol is refluxed for six hours. The solution is concentrated in vacuo to remove the ethanol, diluted with 500 ml. water, cooled and acidified to pH 6 by the addition of acetic acid. The precipitated product is filtered off, washed with water, and dried in vacuo over $P_2O_5$. Yield: 50 g. (93% of theory), M.P. 270–330°. Twofold recrystallization from ethanol-water gives pure 5-acetyl-2-carboxyltryptamine hydrate, M.P. 337–343°, after softening and resolidification at 270°.

Analysis—Calc.: C, 59.08; H, 6.10; N, 10.60. Found: C, 59.04; H, 6.18; N, 10.77.

Analysis of the hydrochloride salt—Calc.: C, 55.22; H, 5.35; N, 9.91; Cl, 12.54. Found: C, 55.51, H, 5.62; N, 9.67; Cl, 12.51.

EXAMPLE 4

5-acetyltryptamine

A suspension of 64 g. of 5-acetyl-2-carboxytryptamine in 800 ml. glacial acetic acid and 2 liters of 20% hydrochloric acid is refluxed with stirring for three hours. The reaction mixture is cooled and 30 g. of the hydrochloride of the unreacted starting material is removed by filtration. The filtrate is basified to pH 11 by the addition of 40% potassium hydroxide solution mixed with ice, and extracted six times with one liter portions of chloroform. The combined extracts are dried over $Na_2SO_4$ and evaporated in vacuo to give 15 g. of crystalline residue. Recycling the recovered starting material gave a total of 30 g. (57%) of crude product. Two recrystallizations from water give pure 5-acetyltryptamine, M.P. 140–2°.

Analysis—Calc.: C, 71.26; H, 6.98; N, 13.85. Found: C, 70.99; H, 6.93; N, 14.09.

Treatment of an ethanolic solution of 5-acetyltryptamine with ethanolic hydrogen chloride solution results in separation of the hydrochloride salt. Pure 5-acetyltryptamine hydrochloride is obtained by recrystallization from 95% ethanol, M.P. 228–230°.

Analysis—Calc.: C, 60.37; H, 6.33; N, 11.74; Cl, 14.85. Found: C, 60.48; H, 6.37; N, 11.51; Cl, 14.85.

EXAMPLE 5

5-acetyl-3-(2-acetamidoethyl)indole

A mixture of 6 g. 5-acetyltryptamine and 50 ml. acetic anhydride is heated on a steam bath until complete solution is obtained. The reaction mixture is allowed to cool gradually overnight. The precipitated crystalline product is filtered off and recrystallized from ethanol to yield 4 g. (80% of theory) of 5-acetyl-3-(2-acetamidoethyl)indole, M.P. 152–155°.

Analysis—Calc.: C, 68.83; H, 6.60; N, 11.47. Found: C, 68.68; H, 6.66; N, 11.29.

EXAMPLE 6

3-(β-dimethylaminoethyl)-5-acetyl-2-carboxytryptamine hydrochloride

To 700 mg. of 5-acetyl-2-carboxytryptamine hydrochloride dissolved in 20 ml. of water is added 1 ml. of formalin and 0.5 g. 5% palladium on carbon. The mixture is hydrogenated at atmospheric pressure and room temperature until after 18 hrs. hydrogen uptake ceases. The mixture is then filtered, and the filtrate is evaporated to dryness invacuo. The crystalline residue is recrystallized from isopropanol to yield pure 3-(β-dimethylaminoethyl)-5-acetyl-2-carboxytryptamine hydrochloride as a monohydrate, M.P. 246–47°.

Analysis—Calc.: C, 54.79; H, 6.44; N, 8.52; Cl, 10.78. Found: C, 55.00; H, 6.71; N, 8.89; Cl, 10.65.

EXAMPLE 7

6-methyl-2,3-piperidinedione-3-(p-acetylphenyl)-hydrazone

To one liter of 0.5-N potassium hydroxide are added 92.5 g. 6-methyl-3-carbethoxy-2-piperidone (prepared by the hydrogenation over 10% palladium on charcoal of ethyl-α-carbethoxy-δ-ketocaproate in absolute ethanol saturated with ammonia). The mixture is kept at 30° for eighteen hours. The solution is filtered, cooled to 0°, and acidified with 50 ml. of 6-N hydrochloric acid. This is added with stirring at 0° to a fresh solution of p-acetylphenyldiazonium chloride (prepared from 67.5 g. p-aminoacetophenone in 957 ml. of 2.7-N hydrochloric acid and 36.25 g. sodium nitrite in 125 ml. water). The solution is adjusted to about pH 3.5 by the addition of a solution of 125 g. anhydrous sodium acetate in 250 ml. water. The mixture is stirred for five hours at 0–10°, and the precipitated orange product filtered off, and recrystallized from 70% aqueous ethanol. Yield: 78 g. (60% of theory), M.P. 239–40°. Threefold recrystallization yields pure 6-methyl-2,3-piperidinedione-3-(p-acetylphenyl)hydrazone, M.P. 250–51°.

Analysis—Calc.: C, 64.84; H, 6.61; N, 16.21. Found: C, 64.68; H, 6.77; N, 16.03.

EXAMPLE 8

6-acetyl-3-methyl-1,2,3,4-tetrahydro-1-oxo-β-carboline

A suspension of 78 g. of 6-methyl-2,3-piperidinedione-3-(p-acetylphenyl)hydrazone in 390 ml. 88% formic acid is refluxed for four hours. After cooling, the precipitated material is filtered off and dried in vacuo over $P_2O_5$. Yield: 57 g. (78% of theory), M.P. 355–61°. Recrystallization from 88% formic acid yields pure 6-acetyl-3-methyl-1,2,3,4-tetrahydro-1-oxo-β-carboline, M.P. 358–60°.

Analysis—Calc.: C, 69.40; H. 5.82; N, 11.56. Found: C, 69.55; H, 5.94; N, 11.40.

EXAMPLE 9

5-acetyl-2-carboxy-α-methyltryptamine

Treatment of 6-acetyl-3-methyl-1,2,3,4-tetrahydro-1-oxo-β-carboline with potassium hydroxide followed by acidification as described in Example 3 yields, after twofold recrystallization from 50% ethanol-water, pure 5-acetyl-2-carboxy-α-methyltryptamine hydrate, M.P. 316–324°.

Analysis—Calc.: C, 60.42; H, 6.52; N, 10.07. Found: C, 60.69; H, 6.66; N, 9.85.

EXAMPLE 10

5-acetyl-α-methyltryptamine

Treatment of 5-acetyl-2-carboxy-α-methyltryptamine with acetic and hydrochloric acids followed by basification as described in Example 4 yields, after recrystallization from water, 5-acetyl-α-methyltryptamine, M.P. 161–164°.

Analysis—Calc.: C, 72.19; H, 7.46; N, 12.95. Found: C, 72.25; H, 7.43; N, 12.94.

EXAMPLE 11

5-methyl-2,3-piperidinedion-3-(p-acetylphenyl)hydrazone

To 200 ml. of 0.5-N potassium hydroxide are added 18.5 g. 3-carbethoxy-5-methyl-2-piperidone and the mixture is kept at room temperature for 18 hours. The solution is filtered, cooled to 0°, and acidified with 10 ml. of 6-N hydrochloric acid. This is added with stirring at 0° to a fresh solution of p-acetylphenyldiazonium chloride (prepared from 13.5 g. p-aminoacetophenone in 191.25 ml. 2.7-N hydrochloric acid and 7.25 g. sodium nitrite in 25 ml. water). The solution is adjusted to about pH 3.5 by the addition of a solution of 25 g. anhydrous sodium acetate in 50 ml. water and stirred for five hrs. at 0–10°. The precipitated orange product is filtered off and recrystallized from absolute ethanol. Yield: 10 g. (38% of theory), M.P. 226–44°. Twofold recrystallization from 70% aqueous ethanol gives pure 5-methyl-2,3-piperidinedione-3-(p-acetylphenyl)hydrazone, M.P. 243–44°.

Analysis.—Calc.: C, 64.84; H, 6.61; N, 16.21. Found: C, 64.75; H, 6.73; N, 16.29.

EXAMPLE 12

*6-acetyl-4-methyl-1,2,3,4-tetrahydro-1-oxo-β-carboline*

A suspension of 9 g. of 5 methyl-2,3-piperidinedione-3-(p-acetylphenyl)hydrazone in 45 ml. 88% formic acid is refluxed for four hours. The solution is concentrated to half of its volume and the concentrate is diluted with two volumes of water. The precipitated yellow product is filtered off, washed with water, and dried in vacuo over $P_2O_5$. Yield: 5 g. (60% of theory), M.P. 330–40°. Recrystallization from absolute ethanol yields pure 6-acetyl-4-methyl-1,2,3,4-tetrahydro-1-oxo-β-carboline, M.P. 360–65°.

Analysis—Calc.: C, 69.40; H, 5.82; N 11.56. Found: C, 69.63; H, 5.88; N, 11.40.

Treatment of this compound by the procedure of Example 3 yields 5-acetyl-2-carboxy-β-methyltryptamine which may be treated as described in Example 4 to yield 5-acetyl-β-methyltryptamine.

EXAMPLE 13

*2,3-piperidinedione-3-(p-propionylphenyl)hydrazone*

To 200 ml. of 0.5-N potassium hydroxide is added 17 g. 3-carbethoxy-2-piperidone and the mixture is kept at 30° for eighteen hours. The solution is filtered, cooled to 0°, and acidified with 10 ml. of 6-N hydrochloric acid. This is added with stirring at 0° to a fresh solution of p-propionylphenyldiazonium chloride (prepared from 14.9 g. p-aminopropiophenone in 191.25 ml. 2.7-N hydrochloric acid and 7.25 g. sodium nitrite in 25 ml. $H_2O$). The solution is adjusted to about pH 3.5 by the addition of a solution of 25 g. of anhydrous sodium acetate in 50 ml. water and stirring for 5 hrs. at 0–10°. The precipitated yellow orange product is filtered off and recrystallized from methanol to yield 15 g. (58% of theory) of pure 2,3 - piperidinedione - 3-(p-propionylphenyl)hydrazone, M.P. 216–219°.

Analysis—Calc.: C, 64.84; H, 6.61; N, 16.21. Found: C, 64.55; H, 6.72; N, 16.19.

EXAMPLE 14

*6-propionyl-1,2,3,4-tetrahydro-1-oxo-β-carboline*

A suspension of 54 g. of 2,3-piperidinedione-3-(p-propionylphenyl)hydrazone in 270 ml. of 88% formic acid is refluxed for four hours. After cooling 41 g. of precipitated material are filtered off and dried in vacuo over $P_2O_5$. An additional 5 g. of material are obtained by concentrating the filtrate to about one third of its volume in vacuo, and diluting the concentrate with twice its volume of water. Yield: 46 g. (90% of theory), M.P. 345–53°. Recrystallization from 88% formic acid yields 6-propionyl-1,2,3,4-tetrahydro-1-oxo-β-carboline, M.P. 356–60°.

Analysis—Calc.: C, 69.40; H, 5.82; N, 11.56. Found: C, 69.00; H, 5.97; N, 11.28.

EXAMPLE 15

*5-propionyl-2-carboxytryptamine*

A suspension of 41 g. of 6-propionyl-1,2,3,4-tetrahydro-1-oxo-β-carboline in a solution of 100 g. potassium hydroxide in 875 ml. of 60% aqueous ethanol is refluxed for 24 hours. The solution is concentrated in vacuo to remove the ethanol, diluted with 500 ml. of water, cooled and acidified to pH 6 by addition of acetic acid. The precipitated product is filtered off, and washed with water. The crude product was recrystallized from 50% aqueous ethanol, and dried in vacuo over $P_2O_5$. Yield: 41 g. (93% of theory) of 5-propionyl-2-carboxytryptamine, M.P. 269–73°.

Analysis—Calc.: C, 64.60; H, 6.20; N, 10.76. Found: C, 64.46; H, 6.19; N, 10.04.

Analysis of the hydrochloride salt (M.P. 299–305°)— Calc.: C, 56.66; H, 5.78; N, 9.44; Cl, 11.95. Found: C, 56.74; H, 5.96; N, 9.71; Cl, 12.08.

EXAMPLE 16

*5-propionyltryptamine*

A suspension of 6 g. of 5-propionyl-2-carboxytryptamine in a solution of 75 ml. of glacial acetic acid in 200 ml. of 20% hydrochloric acid is refluxed with stirring for 24 hours. The reaction mixture is cooled, and basified to pH 11 by addition of 40% potassium hydroxide solution mixed with ice. The alkaline solution is extracted ten times with 100 ml. portions of chloroform. The combined extracts are dried over $Na_2SO_4$ and evaporated in vacuo. The residue is taken up in 100 ml. of boiling water, treated with charcoal, and filtered. On cooling 1.3 g. (26% of theory) of crystalline material, M.P. 124–125°, is obtained. Twofold recrystallization from water gives pure 5-propionyltryptamine, M.P. 127–30°.

Analysis—Calc.: C, 72.19; H, 7.46; N, 12.95. Found: C, 71.91; H, 7.46; N, 12.92.

An ethanolic solution of 5-propionyltryptamine is treated with ethanolic hydrogen chloride solution whereupon the hydrochloride crystallizes out. This is recrystallized twice from absolute ethanol to give the pure hydrochloride of 5-propionyltryptamine, M.P. 212–14°.

Analysis—Calc.: C, 61.77; H, 6.78; N, 11.08; Cl, 14.03. Found: C, 61.96; H, 6.79; N 11.12; Cl, 13.98.

EXAMPLE 17

*5-methyl-2,3-piperidinedione-3-(p-propionylphenyl)-hydrazone*

To 200 ml. of 0.5-N potassium hydroxide are added 18.5 g. 5-methyl-3-carbethoxy-2-piperidone and the mixture is kept at room temperature for 18 hours. The solution is filtered, cooled to 0°, and acidified with 10 ml. of 6-N hydrochloric acid. This was added with stirring at 0° to a fresh solution of p-propionylphenyldiazonium chloride, prepared from 14.9 g. p-aminopropiophenone in 191.5 ml. 2.7-N hydrochloric acid and 7.25 g. sodium nitrite in 25 ml. water. The solution is adjusted to about pH 3.5 by the addition of a solution of 25 g. anhydrous sodium acetate in 50 ml. water and stirred for five hrs. at 0–10°. The precipitated yellow-orange product is filtered off, and recrystallized from 50% aqueous ethanol. Yield: 13 g. (47% of theory) of pure 5-methyl-2,3-piperidinedione-3-(p-propionylphenyl)hydrazone, M.P. 238–240°.

Analysis—Calc.: C, 65.91; H, 7.00; N, 15.38. Found: C, 65.93; H, 7.16; N, 15.25.

EXAMPLE 18

*4-methyl-6-propionyl-1,2,3,4-tetrahydro-1-oxo-β-carboline*

A suspension of 11 g. of 5-methyl-2,3-piperidinedione-3-(p-propionylphenyl)hydrazone in 55 ml. 88% formic acid is refluxed for four hours. After cooling 5.5 g. of precipitated material is filtered off and dried in vacuo over $P_2O_5$. An additional 3.8 g. of material is obtained by concentrating the filtrate in vacuo and diluting the concentrate with water. Yeild: 9.3 g. (90% of theory), M.P. 320–26°. Recrystallization from 88% formic acid with charcoal yields pure 4-methyl-6-propionyl-1,2,3,4-tetrahydro-1-oxo-β-carboline, M.P. 326–31°.

Analysis—Calc.: C, 70.29; H, 6.29; N, 10.93. Found: C, 70.05; H, 6.06; N, 11.12.

EXAMPLE 19

*5-propionyl-2-carboxy-β-methyltryptamine*

Treatment of 4-methyl-6-propionyl-1,2,3,4-tetrahydro-oxo-β-carboline with potassium hydroxide followed by acidification as described in Example 3 yields (at 90% of theory) 5-propionyl-2 - carboxy - β - methyltryptamine, M.P. greater than 300°.

Analysis.—Calc.: C, 65.67; H, 6.61; N, 10.21. Found: C, 65.46; H, 6.85; N, 10.45.

EXAMPLE 20

5-propionyl-β-methyltryptamine

Treatment of 5-propionyl-2-carboxy-β-methyltryptamine with acetic and hydrochloric acids followed by basification and treatment with ethereal hydrogen chloride, as described in Example 24 hereinafter, yields the hydrochloride salt of 5-propionyl-β-methyltryptamine, M.P. 210–214°.

Analysis—Calc.: C, 63.01; H, 6.43; N, 10.50; Cl, 13.29. Found: C, 63.27; H, 6.41; N, 10.74; Cl, 13.02.

EXAMPLE 21

2,3-piperidinedione-3-(p-benzoylphenyl)hydrazone

To 400 ml. of 0.5-N potassium hydroxide are added 34 g. 3-carbethoxy-2-piperidone and the mixture is kept at 30° for twenty hours. The solution is filtered, cooled to 0°, and acidified with 20 ml. of 6-N hydrochloric acid. This is added with stirring at 0° to a fresh solution of p-benzoylphenyldiazonium chloride (prepared from 34.6 g. p-aminobenzophenone in 382 ml. 2.6-N hydrochloric acid and 14.5 g. sodium nitrite in 50 ml. water at 0°). After stirring for 15 minutes, the solution is adjusted to about pH 3.5 by the addition of a solution of 35 g. sodium acetate in 75 ml. water. The solution is stirred for 5 hours at 0–10°. The precipitated yellow orange product is collected by filtration, dried in vacuo over $P_2O_5$ at room temperature, and recrystallized from ethanol. Yield: 22 g. (55% of theory), M.P. 204–206°. Recrystallization from ethanol yields pure 2,3-piperidinedione-3-(p-benzoylphenyl)hydrazone, M.P. 206–208°.

Analysis—Calc.: C, 70.34; H, 5.58; N, 13.67. Found: C, 70.06; H, 5.88; N, 13.50.

EXAMPLE 22

6-benzoyl-1,2,3,4-tetrahydro-1-oxo-β-carboline

A suspension of 22 g. 2,3-piperidinedione-3-(p-benzoylphenyl)hydrazone in 110 ml. 88% formic acid is refluxed for four hours. The resulting solution is then concentrated to a very small volume to remove most of the formic acid and diluted with several volumes of water. The heavy precipitate formed is filtered off, washed with some cold water, and dried in vacuo over $P_2O_5$ at room temperature. Yield: 19.5 g. (92.5% of theory), M.P. 270–282°. Recrystallization from ethanol yields pure 6-benzoyl-1,2,3,4-tetrahydro-1-oxo-β-carboline, M.P. 284–287°.

Analysis—Calc.: C, 74.46; H, 4.86; N, 9.65. Found: C, 74.59; H, 4.92; N, 9.61.

EXAMPLE 23

5-benzoyl-2-carboxytryptamine

A suspension of 18 g. of 6-benzoyl-1,2,3,4-tetrahydro-1-oxo-β-carboline in a solution of 40 g. potassium hydroxide in 375 ml. of 60% aqueous ethanol is refluxed for six hours. The solution is chilled and then adjusted to about pH 6 by addition of glacial acetic acid. The yellow precipitate is filtered off, washed with water, and dried in vacuo over $P_2O_5$. Yield: 17.81 g. (93% of theory), M.P. 270–275°. Twofold recrystallization from ethanol:water (1:1) yields pure 5-benzoyl-2-carboxytryptamine, M.P. 240–243°, followed by resolidification and a second M.P. at 285–291°.

Analysis—Calc.: C, 70.11; H, 5.23; N, 9.09. Found: C, 70.38; H, 5.28; N, 9.33.

Analysis of the hydrochloride salt (M.P. 268–270°)—Calc.: C, 62.70; H, 4.97; N, 8.12; Cl, 10.28. Found: C, 62.93; H, 5.05; N, 7.97; Cl, 10.24.

EXAMPLE 24

5-benzoyltryptamine

A suspension of 15 g. of 5-benzoyl-2-carboxytryptamine in a solution of 75 ml. glacial acetic acid in 400 ml. of 20% hydrochloric acid is refluxed with stirring for 14 hours. The reaction mixture is cooled and 2.5 g. of the hydrochloride of the starting material is removed by filtration. The chilled filtrate is basified to pH 11 by addition of 40% potassium hydroxide, and extracted five times with 200 ml. portions of chloroform. The combined extracts are dried over $Na_2SO_4$ and evaporated in vacuo to dryness. The residue is dissolved in 500 ml. ethyl acetate, filtered, and treated with excess ethereal hydrogen chloride. The precipitated hydrochloride is collected, dissolved in 500 ml. of isopropanolmethanol (9:1) and filtered. The solution is concentrated in vacuo until crystallization begins and the solution is kept at 0–5° for several hours. The precipitate is collected and dried in vacuo over $P_2O_5$ at room temperature. Additional material is obtained by further concentration of the mother liquor. Yield: 6.85 g. of 5-benzoyltryptamine hydrochloride, M.P. 234–236°.

Analysis—Calc.: C, 67.88; H, 5.70; N, 9.31; Cl, 11.79. Found: C, 67.83; H, 5.85; N, 9.60; Cl, 11.53.

An aqueous solution of 5-benzoyltryptamine hydrochloride is made basic by the addition of 10% sodium hydroxide solution. The solution is extracted with chloroform several times, and the combined chloroform extracts are evaporated. The residue is crystallized from aqueous methanol to give 5-benzoyltryptamine, 280–284°.

EXAMPLE 25

5-methyl-2,3-piperidinedione-3-(p-benzoylphenyl)-hydrazone

The interaction of 3-carbethoxy-5-methyl-2-piperidone with p-benzoylphenyldiazonium chloride by the procedure described in Example 11 yields (at 70% of theory) 5-methyl-2,3-piperidinedione-3-(p-benzoylphenyl)hydrazone, M.P. 174–186°. Twofold recrystallization from 70% aqueous ethanol yields the pure product, M.P. 197–202°.

Analysis—Calc.: C, 71.01; H, 5.96; N, 13.08. Found: C, 70.97; H, 6.19; N, 13.24.

Treatment of the above compound with 88% formic acid under reflux by the procedure of Example 2 yields 6-benzoyl-4-methyl-1,2,3,4-tetrahydro-1-oxo-β-carboline, which may be treated with potassium hydroxide followed by acidification by the procedure of Example 3 to yield 5-benzoyl-2-carboxy-β-methyltryptamine. Treatment of this latter compound with acetic and hydrochloric acids followed by basification as described in Example 4 yields 5-benzoyl-β-methyltryptamine.

EXAMPLE 26

5-acetyl-2-carbethoxygramine

To a solution of freshly prepared p-acetylphenyldiazonium chloride at 0° (prepared by the addition of 21 g. sodium nitrite in 200 ml. water to 40 g. p-aminoacetophenone in 250 ml. water and 143 ml. conc. HCl) are added 60.3 g. ethyl-α-(2-dimethylaminoethyl)acetoacetate and 63 g. sodium acetate. The pH is adjusted to 6.5 by the addition of 3 N sodium hydroxide. The mixture is stirred in the cold for 2 hours, basified and then extracted with three 400 ml. portions of chloroform. The combined extracts are dried over sodium sulfate and concentrated in vacuo. Recrystallization of the residue from benzene-petroleum ether yields 65 g. of ethyl-α-keto-γ-dimethylaminobutyrate p-acetylphenylhydrazone.

A mixture of 43 g. of the above compound and 430 g. polyphosphoric acid is heated with stirring. At 60–65° an exothermic reaction occurs. The temperature is gradually raised to 100–110° and maintained for two hours and the mixture is poured into 700 ml. of ice water. The aqueous mixture is stirred to complete solution, basified at low temperature with 3 N sodium hydroxide and extracted with three 400 ml. portions of chloroform. The combined chloroform extracts are dried over sodium sulfate and concentrated in vacuo. The residue is dissolved in ethyl acetate and treated with ethereal HCl. The precipitate is collected, washed with ether and dried in vacuo at 110°, M.P. 182–195°. Yield: 17.8 g. (39% of theory). Recrystallization from acetonitrile yields the pure hydrochloride of 5-acetyl-2-carbethoxygramine, M.P. 211–214°.

Analysis—Calc.: C, 59.16; H, 6.52; N, 8.63. Found: C, 59.21; H, 6.82; N, 8.89.

Treatment of the above compound with acid results in its hydrolysis to yield 5-acetyl-2-carboxygramine which may, in turn, be treated with acetic and hydrochloric acids followed by basification as described in Example 4 to yield 5-acetylgramine.

EXAMPLE 27

*2,3-piperidinedione-3-(m-acetylphenyl)hydrazone*

To 200 ml. of 0.5-N potassium hydroxide is added 17 g. 3-carbethoxy-2-piperidone and the mixture is kept at 30° for eighteen hours. The solution is filtered, cooled to 0°, and acidified with 10 ml. of 6-N hydrochloric acid. This is added with stirring at 0° to a fresh solution of m-acetylphenyldiazonium chloride (prepared from 13.5 g. m-aminoacetophenone in 191.25 ml. 2.7-N hydrochloric acid and 7.25 g. sodium nitrite in 25 ml. water). The solution is adjusted to about pH 3.5 by the addition of a solution of 25 g. anhydrous sodium acetate in 50 ml. of water and stirred at 0–10° for five hours. The precipitated light brown material is filtered off, and recrystallized from 95% ethanol. Yield: 10 g. (41% of theory), M.P. 174–80°. Recrystallization from 95% ethanol yields pure 2,3-piperidinedione-3-(m-acetylphenyl)hydrazone as a hemihydrate, M.P., shrinks at 160–65°, melts 204–06°.

Analysis—Calc.: C, 61.40; H, 6.34; N, 16.53. Found: C, 61.58; H, 6.59; N, 16.87.

EXAMPLE 28

*5-acetyl-1,2,3,4-tetrahydro-1-oxo-β-carboline and 7-acetyl-1,2,3,4-tetrahydro-1-oxo-β-carboline*

A suspension of 34 g. of 2,3-piperidinedione-3-(m-acetylphenyl)hydrazone in 170 ml. 88% formic acid is refluxed for four hours. The solution is concentrated to about half its volume under vacuo, and diluted with 100 ml. of water. An oil precipitates out which solidifies on standing. The solids are filtered off, washed with cold water, and dried in vacuo over $P_2O_5$. Yield: 26 g. (81% of theory), M.P. 205–40°. The isomeric mixture is separated by fractional crystallization from absolute ethanol. The less soluble isomer which is 7-acetyl-1,2,3,4-tetrahydro-1-oxo-β-carboline has a melting point of 283–86°.

Analysis—Calc.: C, 68.40; H, 5.30; N, 12.27. Found: C, 68.30; H, 5.38; N, 12.45.

The more soluble isomer which is 5-acetyl-1-oxo-1,2,3,4-tetrahydro-β-carboline has a melting point of 241–43°.

Analysis—Found: C, 68.62; H, 5.48; N, 12.06.

EXAMPLE 29

*6-acetyl-2-carboxytryptamine*

A suspension of 1 g. of 7-acetyl-1,2,3,4-tetrahydro-1-oxo-β-carboline in a solution of 2.5 g. potassium hydroxide in 20 ml. of 60% aqueous ethanol is refluxed for six hours. The solution is concentrated in vacuo to remove ethanol, diluted with 10 ml. of water, cooled, and acidified to pH 6 by addition of glacial acetic acid. The precipitated product is filtered off, washed with water, and dried in vacuo over $P_2O_5$, M.P. 240–43°. Recrystallization from 50% aqueous ethanol yields pure 6-acetyl-2-carboxytryptamine hydrate as a hemiethanolate, M.P. 240–43°.

Analysis—Calc.: C, 58.52; H, 6.66; N, 9.75. Found: C, 58.74; H, 6.40; N, 9.73.

Analysis of the hydrochloride salt (as a hydrate)—Calc.: C, 51.91; H, 5.70; N, 9.31; Cl, 11.79. Found: C, 52.07; H, 5.91; N, 9.28; Cl, 11.78.

EXAMPLE 30

*6-acetyltryptamine*

A suspension of 30 g. of 6-acetyl-2-carboxytryptamine in 1200 ml. of 20% hydrochloric acid is refluxed with stirring for three hours. The reaction mixture is cooled and filtered free of black decomposition products. The filtrate is basified to pH 11 by addition of 40% potassium hydroxide solution mixed with ice, and extracted ten times with 200 ml. portions of chloroform. The combined extracts are dried over $Na_2SO_4$ and evaporated in vacuo to give a solid residue. This residue, crystallized from absolute ethanol gives 3.5 gms. of 6-acetyltryptamine, M.P. 147–49°. Recrystallization from water raises the melting point to 148–50°.

Analysis—Calc.: C, 71.26; H, 6.98; N, 13.85. Found: C, 71.38; H, 7.18; N, 14.08.

EXAMPLE 31

*4-acetyl-2-carboxytryptamine*

A suspension of 1 g. of 5-acetyl-1,2,3,4-tetrahydro-1-oxo-β-carboline in a solution of 2.5 g. potassium hydroxide in 20 ml. of 60% aqueous ethanol is refluxed for six hours. The solution is concentrated in vacuo to remove the ethanol, diluted with 10 ml. of water, cooled, and acidified to pH 6 by addition of glacial acetic acid. The precipitated product is filtered off, washed with water, and dried in vacuo. Yield: 1 g. (93% of theory). Recrystallization from 50% aqueous ethanol yields pure 4-acetyl-2-carboxytryptamine, M.P. 314–17°.

Analysis—Calc.: C, 63.40; H, 5.73; N, 11.38. Found: C, 63.59; H, 5.99; N, 11.46.

EXAMPLE 32

*Cycloanhydro-4-acetyltryptamine*

A suspension of 1 g. of 4-acetyl-2-carboxytryptamine in a solution of 12 ml. of glacial acetic acid in 30 ml. of 20% hydrochloric acid is refluxed for six hours. The reaction mixture is cooled and basified to pH 11 by addition of 40% potassium hydroxide solution mixed with ice. The precipitate is filtered off, washed with water, and dried in vacuo over $P_2O_5$. Yield: 0.4 g. (53% of theory), M.P. 270–75°. Recrystallization from 50% aqueous ethanol yields cycloanhydro-4-acetyltryptamine, M.P. 272–77°.

Analysis—Calc.: C, 78.22; H, 6.57; N, 15.21. Found: C, 77.98; H, 6.59; N, 15.36.

EXAMPLE 33

*5-methyl-2,3-piperidinedione-3-(m-acetylphenyl)hydrazone*

Interaction of 3-carbethoxy-5-methyl-2-piperidone and m-acetylphenyldiazonium chloride by the procedure described in Example 27 yields, after twofold recrystallization from 70% aqueous ethanol, 5-methyl-2,3-piperidinedione-3-(m-acetylphenyl)hydrazone, M.P. 215–216°.

Analysis—Calc.: C, 64.84; H, 6.61; N, 16.21. Found: C, 64.64; H, 6.59; N, 15.99.

Treatment of this compound with 88% formic acid as described in Example 28 yields the isomeric 7-acetyl-4-methyl - 1,2,3,4 - tetrahydro - 1 - oxo - β - carboline and 5 - acetyl - 4 - methyl - 1,2,3,4 - tetrahydro - 1 - oxo - β-carboline. The former may be converted, as described in Examples 29 and 30, to 6-acetyl-2-carboxy-β-methyltryptamine and 6-acetyl-β-methyltryptamine. The latter may be converted, as described in Examples 31 and 32, to 4 - acetyl - 2 - carboxy - β - methyltryptamine and cycloanhydro-4-acetyl-β-methyltryptamine. Treatment of the above cycloanhydro compound with aqueous acid yields 4-acetyl-β-methyltryptamine.

In the foregoing examples, all temperatures are given in degrees centigrade.

It is understood that the foregoing detailed description is given merely by way of illustration and that many variations may be made therein without departing from the spirit of our invention.

Having described our invention, what we desire to secure by Letters Patent is:

1. A compound of the formula:

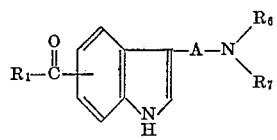

wherein $R_1$ is a member selected from the group consisting of lower alkyl, benzyl, chlorobenzyl and pyridyl and A is a member selected from the group consisting of

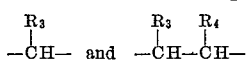

in which $R_3$ and $R_4$ are members selected from the group consisting of hydrogen and lower alkyl and $R_6$ and $R_7$ are members selected from the group consisting of hydrogen and lower alkyl, and the pharmaceutically acceptable nontoxic acid addition and quaternary ammonium salts thereof with a compound selected from the group consisting of methyl iodide, ethyl bromide, n-hexyl-bromide, benzyl chloride, methyl sulfate, ethyl sulfate, and methyl-p-toluene sulfonate.

2. A compound of the formula

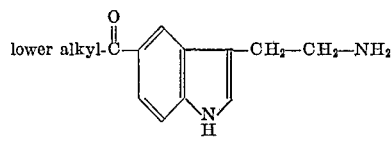

3. 5-acetyl-2-carboxytryptamine.
4. 5-acetyltryptamine.
5. 5-acetyl-3-(2-acetamidoethyl)indole.
6. 3-($\beta$-dimethylaminoethyl)-5-acetyl-2-carboxytryptamine.
7. 5-acetyl-2-carboxy-$\alpha$-methyltryptamine.
8. 5-acetyl-$\alpha$-methyltryptamine.
9. 5-propionyl-2-carboxytryptamine.
10. 5-propionyltryptamine.
11. 5-propionyl-2-carboxy-$\beta$-methyltryptamine.
12. 5-propionyl-$\beta$-methyltryptamine.
13. 5-benzoyl-2-carboxytryptamine.
14. 5-benzoyltryptamine.
15. 5-acetyl-2-carbethoxygramine.
16. 6-acetyl-2-carboxytryptamine.
17. 6-acetyltryptamine.
18. 4-acetyl-2-carboxytryptamine.
19. A compound of the formula:

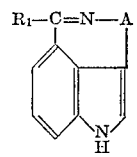

wherein $R_1$ is a member selected from the group consisting of lower alkyl, benzyl, chlorobenzyl and pyridyl and A is a member selected from the group consisting of

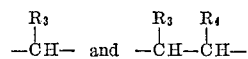

in which $R_3$ and $R_4$ are members selected from the group consisting of hydrogen and lower alkyl.

20. 1H-azepino-(5,4,3,-cd)indole.

References Cited by the Examiner

UNITED STATES PATENTS

| | | | |
|---|---|---|---|
| 2,701,247 | 2/55 | Cavallito et al. | 260—294.7 |
| 2,853,490 | 9/58 | Lutz et al. | 260—294.7 |
| 2,980,686 | 4/61 | Robinson | 260—296 |
| 2,995,566 | 8/61 | Sletzinger et al. | 260—319 |
| 3,014,039 | 12/61 | Robinson | 260—296 |
| 3,026,325 | 3/62 | Heinzelman et al. | 260—319 |
| 3,037,031 | 5/62 | Lewis | 260—319 |
| 3,039,247 | 4/62 | Schut | 260—296 |

OTHER REFERENCES

Abramovitch et al.: Canadian J. Chem., pp. 554–556 (1960).

Abramovitch et al.: J. Chem. Society (London), pp. 4589–4593 (1956).

Shavel et al.: J. Am. Chem. Soc., vol. 84, No. 5, pp. 881–882 (1962).

Vane: British Journal of Pharmacol, vol. 14, pp. 87–98 (1959).

IRVING MARCUS, *Primary Examiner*.

NICHOLAS S. RIZZO, *Examiner*.